United States Patent [19]

Shimada et al.

[11] 4,289,822

[45] Sep. 15, 1981

[54] LIGHT-SENSITIVE FILM

[75] Inventors: Toshikazu Shimada, Hinodemachi; Yoshifumi Katayama; Kiichi F. Komatsubara, both of Tokorozawa, all of Japan

[73] Assignee: Hitachi, Ltd., Tokyo, Japan

[21] Appl. No.: 48,740

[22] Filed: Jun. 15, 1979

[30] Foreign Application Priority Data

Jun. 26, 1978 [JP] Japan ................................ 53/76457

[51] Int. Cl.[3] .......................... B32B 7/12; B32B 9/04

[52] U.S. Cl. ................................ 428/212; 204/192 P; 204/192 S; 427/74; 427/93; 427/95; 428/336; 428/411; 428/446; 428/450; 428/913; 428/688; 428/698; 136/258

[58] Field of Search ............... 428/446, 913, 411, 450, 428/539, 212, 336; 427/74, 93, 95; 204/192 P, 192 S

[56] References Cited

U.S. PATENT DOCUMENTS

| | | | |
|---|---|---|---|
| 3,670,198 | 6/1972 | Lehovec | 315/11 |
| 3,943,218 | 3/1976 | Dietze | 427/95 |
| 4,141,764 | 2/1979 | Authier | 427/74 |

OTHER PUBLICATIONS

"Electrical and Optical Properties of Amorphous Silicon Carbide, Silicon Nitride and Germanium Carbide Prepared by Glow Discharge", *Philosophical Magazine*, vol. 35, pp. 1-16 (1977).

M. Le Contellec, et al., "Effects of the Si/C and the H Content of Amorph. S. C. Thin Films Prepared by Reactive Sputtering", *Thin Solid Films, 58* (1979) pp. 407-411.

*Primary Examiner*—Ellis P. Robinson
*Attorney, Agent, or Firm*—Craig and Antonelli

[57] ABSTRACT

A photoconductive material comprising an amorphous substance whose indispensable constituent elements are silicon, carbon and hydrogen is disclosed. The photoconductive material preferably has a structure expressed by $[Si_{1-x}C_x]_{1-y}[H]_y$ where $0.02 \leq x \leq 0.3$ and $0.02 \leq y \leq 0.3$. Up to 40% of the carbon can be substituted by germanium. The peak of response can be established for light of any desired wavelength between approximately 5,600 Å–4,500 Å. This photoconductive material is particularly useful when applied to a light-sensitive film which is operated in the storage mode. The light-sensitive film includes the photoconductive material in a region in which pairs of free electrons and positive holes are created upon incidence of light.

26 Claims, 16 Drawing Figures

LIGHT-SENSITIVE FILM

BACKGROUND OF THE INVENTION

1. Field of the Invention

This invention relates to a novel and excellent light-sensitive film.

2. Description of the Prior Art

As amorphous semiconductor materials for photoconductive materials, there have heretofore been known a material containing a group-IV element such as Si and Ge as its main constituent, a material containing a group-V element such as As as its main constituent, and a material containing a group-VI element such as Se and Te as its main constituent. Among them, the latter two materials often employed at present are toxic substances. Therefore, the amorphous materials whose main constituents are Si, Ge etc. free of toxicity are desired.

Recently, the amorphous body of silicon (Si) containing hydrogen (H), the amorphous body of germanium (Ge) containing hydrogen, and an amorphous material corresponding to an alloy thereof have been deemed hopeful as materials for electron devices. For example, the amorphous silicon and germanium containing hydrogen have been reported by J. Chevallier et al in 'Solid State Communications', vol. 24, pp. 867–869, 1977. These materials, however, are of a limited number and set limits to characteristics in case of considering wide applications as the materials for electron devices. By way of example, the band gap ($E_g$) which is the most important factor for determining the characteristics of an electronic material can be selected only within a range of 0.8–1.65 eV when the Si- and Ge-based amorphous materials are resorted to.

An important example of application of the photoconductive material is a light-receiving face for photoelectric conversion. In case of applying conventional photoconductive materials to light-sensitive films which are used in the storage mode, there have been problems to be stated below.

An important characteristic requested for a photoconductive layer is that a charge pattern stored in the photoconductive layer does not vanish due to diffusion within a time interval in which a specified picture element is scanned for photoelectric conversion by an electron beam or the like (that is, within a storage time). Accordingly, semiconductor materials whose resistivities are at least $10^{10}$ Ω.cm, for example, $Sb_2S_3$-, PbO- and Se-based chalcogenide glasses are usually employed for the photoconductive layer. In case of employing a material such as Si single crystal whose resistivity is less than $10^{10}$ Ω.cm, the surface of the photoconductive layer on the electron beam scanning side needs to be divided in a mosaic pattern so as to prevent the decay of the charge pattern. Among these materials, the Si single crystal requires a complicated working process. The other semiconductors of high resistivities are inferior in the photo response characteristics because they ordinarily contain at high densities the trap levels which impede the transit of photo-carriers, and an imaging device is liable to the drawback that a long lag or an after-image occurs.

SUMMARY OF THE INVENTION

This invention has been made on the basis of the finding that an amorphous material which contains silicon (Si), carbon (C) and hydrogen (H) as indispensable constituent elements, namely, an amorphous material which has a composition expressed by a formula, $[Si_{1-x}C_x]_{1-y}[H]_y$ (hereinbelow, shortly written "amorphous $Si_{1-x}C_x(H)$") is excellent as a photoconductive material. An amorphous material which has a composition of $[Si_{1-x}C_x]_{1-y}[H]_y$ where $0.02 \leq x \leq 0.3$ and $0.02 \leq y \leq 0.3$ is favorable as a photoconductive material. It can naturally be that some impurities are contained in the amorphous material. Part of the composition can be substituted by germanium which is an element belonging to the same group as that of Si and C. A quantity of substitution up to approximately 40% of carbon is possible in practical use.

By preparing the amorphous material with Si and C, a band gap ($E_g$) which is broader than in the material containing Si as its main constituent can be realized. This brings forth the advantage, which is not existent in the known amorphous material containing Si as its main constituent, that a spectral response closer to the spectral luminous efficiency can be bestowed. In the composition range in which x=0.3 or less, the variation of the band gap $E_g$ versus the content of carbon is rectilinear in the extreme, and the control of the characteristics is easy, so that the amorphous material is the most suitable for practical use.

When x is less than 0.02, the variation of the band gap $E_g$ is small from the viewpoint of practical use.

On the other hand, the hydrogen contained in the amorphous material of this invention is conjectured to be a constituent which is particularly effective for rendering amorphous a material which is mainly made up of silicon and carbon.

However, when the hydrogen content is too large, the mechanical strength of a film itself lowers, and also the thermal stability lowers. In the application to a device, therefore, the material containing hydrogen in excess is not favorable in point of lifetime.

In addition, the amorphous material according to this invention is greatly advantageous in that a material of high resistivity is easily obtained.

In view of these advantages, the amorphous material is useful for a light-sensitive film for photoelectric conversion which is operated in the storage mode. Of course, it can be employed for light-sensitive films for other uses.

A light-receiving face which is used in the storage mode comprises, in general, at least a transparent conductive film and a photoconductive film, and this photoconductive film is constructed as a single layer or multi-layer. That region of the photoconductive film which creates pairs of free electrons and positive holes upon the incidence of light is made of the amorphous material which has the composition of $[Si_{1-x}C_x]_{1-y}[H]_y$. When the material is employed for an image pickup tube etc., the resistivity thereof may be made at least $10^{10}$ Ω.cm, preferably at least $10^{12}$ Ω.cm.

DESCRIPTION OF THE PREFERRED EMBODIMENTS

The amorphous material according to this invention which has a composition expressed by a formula, $[Si_{1-x}C_x]_{1-y}[H]_y$ can be manufactured by various methods.

Figure 1:
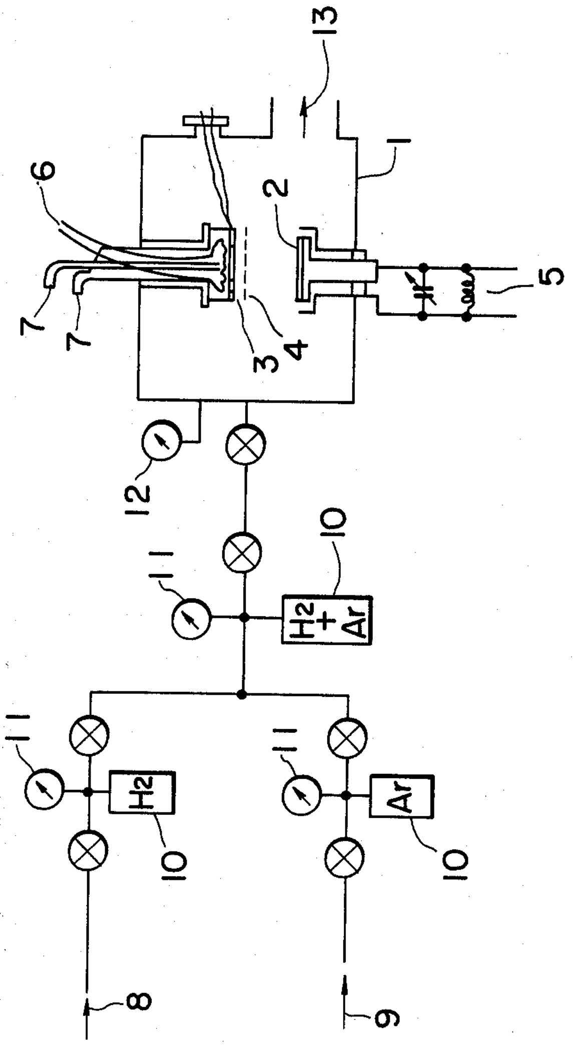
FIG. 1 is an explanatory view showing apparatus for manufacturing a photoconductive material of this invention.

The first method is the reactive sputtering. FIG. 1 shows a model view of apparatus which is used for the reactive sputtering. The apparatus itself is an ordinary sputtering equipment. Numeral 1 designates a vessel which can be evacuated to a vacuum, numeral 2 a sputtering targer, numeral 3 a sample substrate, numeral 4 a shutter, numeral 5 an input from a sputtering radio frequency oscillator, numeral 6 a heater for heating the substrate, numeral 7 water-cooling piping for cooling the substrate, numeral 8 a hydrogen source of high purity, numeral 9 an inlet for a gas such as argon, numeral 10 a gas reservoir, numeral 11 a pressure gauge, numeral 12 a vacuum gauge, and numeral 13 a connection port to an evacuating system.

Figure 2A:
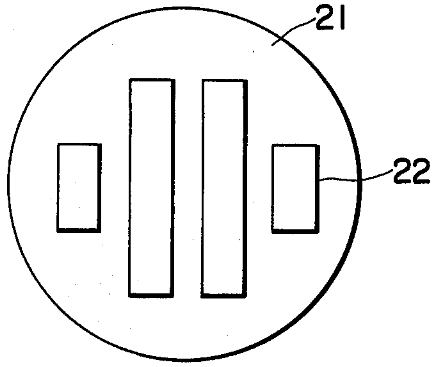
FIGS. 2*a* and 2*b* are a plan view and a sectional view showing an example of a sputtering target, respectively.
Figure 2B:
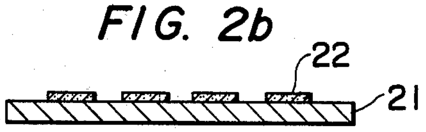

Silicon (Si) and carbon (C) typified by graphite are used for the sputtering target. In this case, the target is conveniently prepared by placing graphite slices 22 on a silicon substrate 21 as shown by way of example in FIGS. 2*a* and 2*b*. FIG. 2*a* is a plan view of the target, and FIG. 2*b* is a sectional view thereof. By appropriately selecting the areal ratio between the silicon and the carbon, the composition of the amorphous $Si_{1-x}C_x$(H) can be controlled. It is of course allowed to dispose silicon slices on a carbon substrate. Further, the target may well be constructed by juxtaposing both the materials.

When Si which is caused to contain, for example, phosphorous (P), arsenic (As), boron (B), gallium (Ga), antimony (Sb), indium (In) or bismuth (Bi) in advance is used for the target for sputtering, such element can be injected as an impurity element. In case of obtaining a material of high resistivity, a quantity of at most 0.1 at % is employed in practical use. This is as in techniques which are common in the field of semiconductor materials. With this method, the amorphous $Si_{1-x}C_x$(H) of any desired conductivity type such as n-type and p-type can be produced. Besides, the resistance value of the material can be varied by the doping with such impurity. Even a high resistance of approximately $10^{13}$ Ω.cm can be realized. As the dark resistivity, $10^{15}$ Ω.cm will be the upper limit in practical use.

And some oxygen is easily included in said amorphous material as an impurity.

Figure 3:
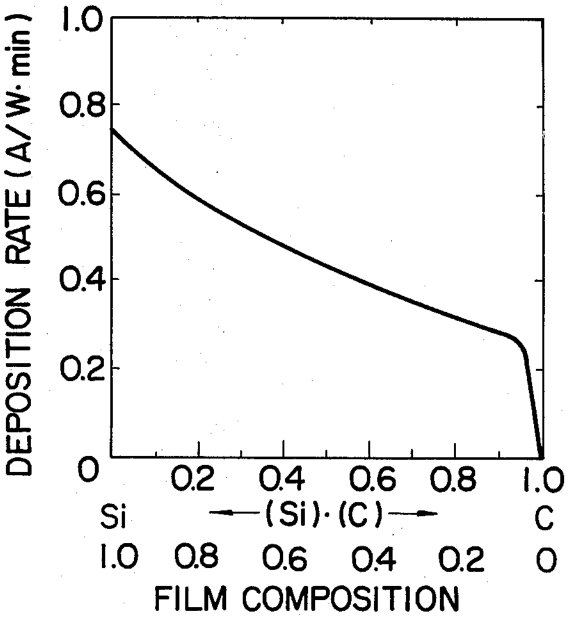
FIG. 3 is a graph showing the relationship between the deposition rate at sputtering and the film composition.
Figure 4:
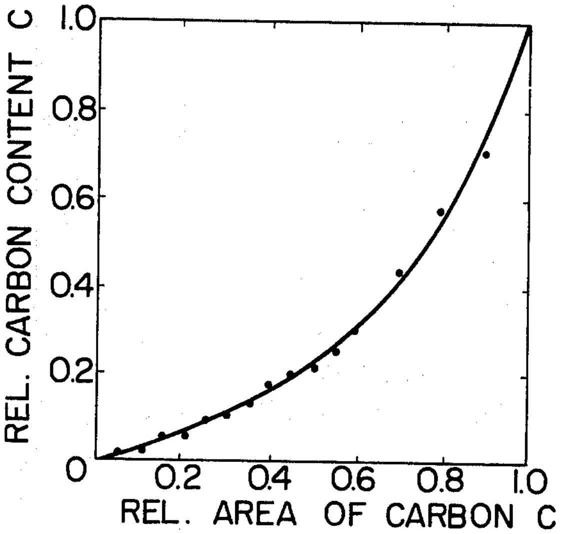
FIG. 4 is a graph showing the relationship between the relative carbon content and the areal ratio of the sputtering target between carbon and silicon.

Using the apparatus as described above, radio-frequency discharge is caused in an argon (Ar) atmosphere which contains hydrogen ($H_2$) at various mixing ratios of at most 30 mol-%, and the Si and graphite are sputtered and deposited on the substrate. Thus, a thin layer is obtained. In this case, the pressure of the Ar atmosphere containing hydrogen may be any value within a range in which the glow discharge can be sustained, and usually the value is approximately 0.01–1.0 Torr. Within 0.1–1.0 Torr, the discharge is especially stable. The temperature of the sample substrate may be selected from within a range of the room temperature to 300° C. Temperatures of approximately 150°–250° C. are the most practical. The reason is that at too low temperatures, the injection of hydrogen into the amorphous material is difficult, while at too high temperatures, hydrogen tends to be emitted from the amorphous material contrariwise. It has been confirmed that, in case where the substrate temperature is held at 200° C., the rate of deposition on the substrate varies depending upon the mixing ratio of Si and C as illustrated in FIG. 3. With this method, accordingly, the formation of the amorphous $Si_{1-x}C_x$(H) whose C-concentrations are 0–99% is efficiently carried out, but the deposition rate becomes extremely low when the concentration of C is 100%. FIG. 4 is a graph showing the compositions of the amorphous $Si_{1-x}C_x$(H) which were produced by varying the areal ratio between the respective components Si and C of the target. The hydrogen content in the atmosphere was 6 mol-% as an example, but the mixing ratio between Si and C may be considered to be, in practice, independent of the hydrogen content in the atmosphere. On the other hand, the hydrogen content is controlled by controlling the partial pressure of hydrogen in the Ar atmosphere. In case where the hydrogen content in the atmosphere is made 5–7 mol-%, a content of about 30 atomic-% can be realized in the amorphous $Si_{1-x}C_x$(H). Regarding other compositions, the partial pressure of hydrogen may be set with the aim roughly fixed to this proportion. As regards the hydrogen component in the material, hydrogen gas produced by heating was measured by the mass spectrometry. Silicon and carbon were measured by the XPS method (X-ray photoemission spectroscopy).

The argon being the atmosphere can be replaced with another rare gas such as krypton (Kr).

A process which is particularly preferable for obtaining a sample of high resistivity is the foregoing method which resorts to the reactive sputtering of a silicon alloy in the mixed atmosphere consisting of hydrogen and the rare gas such as argon. As the sputtering equipment, a low-temperature high-speed sputtering equipment of the magnetron type is suitable.

The second method for manufacturing the amorphous $Si_{1-x}C_x$(H) is one which employs the glow discharge. The glow discharge is caused by the use of a gaseous mixture consisting of $SiH_4$ and $CH_4$, to decompose these organic substances and to deposit the constituent elements on a substrate. Thus, the amorphous $Si_{1-x}C_x$(H) is formed. In this case, the pressure of the gaseous mixture consisting of $SiH_4$ and $CH_4$ is held at a value between 0.1 and 5 Torr. The glow discharge may be established either by the d.c.-glow discharge method or by the r.f.-glow discharge method. By varying the ratio of $SiH_4$ and $CH_4$ which constitute the gaseous mixture, the proportion of Si and C can be controlled. In order to obtain the amorphous $Si_{1-x}C_x$(H) of good quality, the substrate temperature needs to be held at 100°-200° C.

The amorphous $Si_{1-x}C_x(H)$ of the p-type or the n-type can be produced in such a way that 0.1-1% (by volume) of $B_2H_6$ or $PH_3$ is further mixed in the gaseous mixture consisting of $SiH_4$ and $CH_4$, respectively.

As the gases constituting the mixture, $SiH_4$ and $CH_4$ may be substituted by appropriate organic substances such as $C_2H_4$. As the gases for the doping in the case of putting the amorphous $Si_{1-x}C_x(H)$ into the p-type or the n-type, substances including $AsH_3$, $Sb(CH_3)_3$, $Bi(CH_3)_3$ etc. are also effective.

The photoconductive material of this invention can also be manufactured by other methods, for example, the electron-beam evaporation in an active hydrogen atmosphere and the plasma decomposition.

Features of the photoconductive materials of this invention thus far described are summarized as follows:

(1) As compared with the materials of crystalline Si, amorphous Si, etc., the material of this invention has the spectral response to a shorter wavelength region. That is, it can be endowed with the peak of response to light of any desired wavelength between approximately 5,600 Å-4,500 Å.

(2) The material of this invention is more excellent in the thermal resistance than amorphous Si(H), etc.

(3) The manufacturing method of the material of this invention is easy, and comparatively low temperatures (not higher than 300° C.) suffice for the manufacture.

(4) It is easy to make the area large.

(5) The mechanical strength is high.

(6) It is possible to reduce the cost.

(7) The material of this invention is excellent in resistances to chemicals such as alkali. For example, the amorphous silicon dissolves when brought into contact with a solution of NaOH, whereas the amorphous material of this invention scarcely dissolves in practical use.

The photoconductive material of this invention is useful when applied to a light-sensitive film for photoelectric conversion which is operated in the storage mode.

In a photosensor of the storage mode, a high resistance layer for storing a charge pattern and retaining it for a fixed time in order to attain a high resolution need not always be the whole photoconductive layer, but it may be a part of the photoconductive layer including the surface on which the charge pattern appears. Ordinarily, the high resistance layer operates capacitively in terms of an equivalent circuit. As a request from a circuit constant, therefore, it is desirable that the layer is at least 100 nm thick. In general, the thickness of the photoconductive film is selected from within a range of 100 nm-20 μm.

Figure 5:
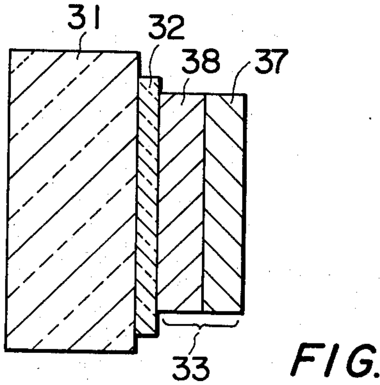
FIGS. 5 to 11 are sectional view each showing a light-receiving face which employs the photoconductive material.

FIG. 5 shows an example of a light-sensitive film in which the high-resistance amorphous photoconductive layer described above is used in only a part of a photoconductive layer 33. The photoconductive layer 33 has a double-layer structure which consists of a high-resistance amorphous photoconductive layer 37 and another photoconductive layer 38. In this case, photo-carriers are generated in the photoconductive layer 38 by light incident in the direction of a faceplate 31, and they are injected into the high-resistance amorphous photoconductive layer 37 and stored as a charge pattern in the surface of the amorphous layer 37. Since the photoconductive layer 38 is not directly concerned in the storage, it need not always have the high resistivity of at least $10^{10}$ Ω.cm and can be made of well-known photoconductors such as CdS, CdSe, Se and ZnSe.

Figure 6:
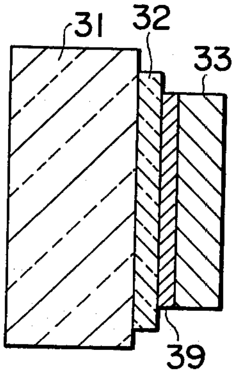
Figure 7:
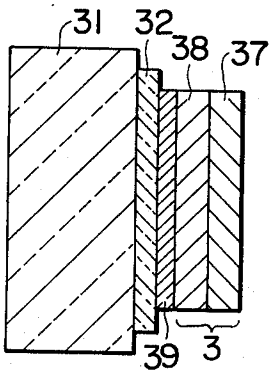

As a light-transmitting conductive layer 32, there can be usually employed a low-resistance oxide film of $SnO_2$, $In_2O_3$, $TiO_2$ or the like or a semitransparent metal film of Al, Au or the like. In order to reduce the dark current of the photosensor and to enhance the response speed, it is desirable to form a rectifying contact between the transparent conductive film 32 and the photoconductive layer 33. By interposing a thin n-type oxide layer between the photoconductive layer 33 and the transparent conductive film 32, it is possible to suppress the injection of positive holes from the transparent conductive film 32 into the photoconductive layer 33. It has been revealed that a good rectifying contact is thus attained. In this case, in order to use the contact as a photodiode, it is desirable to make the transparent conductive film side the positive pole and the amorphous layer side the negative pole. FIG. 6 shows an example of a photosensor of such structure. An n-type oxide layer 39 is interposed between the transparent conductive film 32 and the amorphous photoconductive layer 33. FIG. 7 is a sectional view which also shows an example of a photosensor having an n-type oxide layer. It is the same as the example of FIG. 6 except that the photoconductive layer 33 has the laminated structure consisting of the layers 37 and 38. Usually, a photoconductor which has a sensitivity to the visible region is a semiconductor whose band gap is approximately 2.0 eV. In this case, accordingly, the n-type oxide layer 39 should desirably have a band gap of at least 2.0 eV so as not to hinder the light from arriving at the photoconductive layer 33. In order to check the injection of positive holes from the transparent conductive film 32, the thickness of the n-type oxide layer 39 suffices with a value of approximately 5 nm to 100 nm. As materials for this use, compounds such as cerium oxide, tungsten oxide, niobium oxide, germanium oxide and molybdenum oxide exhibit favorable characteristics. Since these materials ordinarily present the n-type conductivity, they do not hinder photoelectrons, generated in the amorphous photoconductive layer 33 by the light, from flowing towards the transparent conductive film 32.

Figure 8:
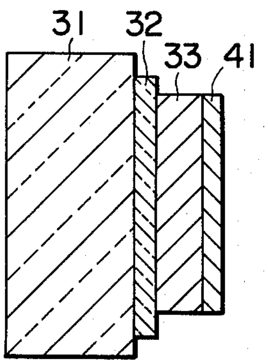
Figure 9:
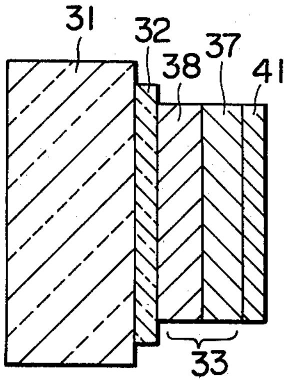
Figure 10:
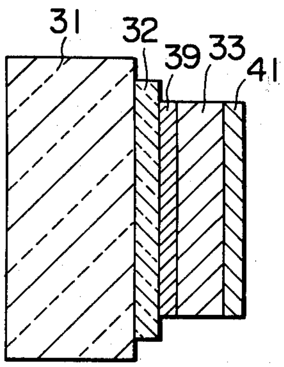
Figure 11:
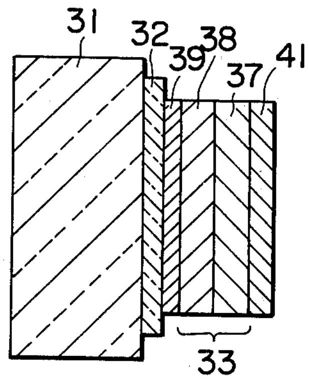

In case where such light-sensitive film is employed as the target of an image pickup tube, it is desirable that an antimony trisulfide layer is further stacked on the surface of the photoconductive layer 33 as a beam landing layer, to prevent the injection of electrons from a scanning electron beam and to suppress the emission of secondary electrons from the photoconductive layer. To this end, the antimony trisulfide film is evaporated in argon gas under a low pressure of from $1\times10^{-3}$ Torr to $1\times10^{-2}$ Torr, and the thickness of the film suffices if it lies within a range of from 10 nm to 1 μm. FIG. 8 is a sectional view showing an example of this structure. The transparent conductive film 32 and the photoconductive film 33 are disposed on the light-transmitting substrate 31, and an antimony trisulfide film 41 is further formed on the resultant structure. Also FIGS. 9 to 11 are sectional views each showing an example in which the antimony trisulfide film 41 is formed on the photoconductive film 33. Herein, FIG. 9 illustrates an example in which the photoconductive film 33 has the laminated structure consisting of the layers 37 and 38, and FIGS. 10 and 11 illustrate examples in which the above measure is applied to the structure having the n-type oxide layer 39 interposed between the photoconductive film 33 and the transparent electrode 32.

Although, as the photoconductive layer 33, only the example made up of the single layer or the example made up of the two layers of the layers 37 and 38 has beem described thus far, the photoconductive layer may well be constructed of more layers. In this case, it is a matter of course that a portion to store the charge pattern is formed as the high resistance layer as described before.

The composition may well be varied continuously.

The constructions of the various light-receiving faces thus far explained may be selected according to purposes.

Features of the light-receiving faces described above are summed up as follows:

(1) A high resolution of above 800 lines per inch can be reailized.

(2) As compared with the light-receiving faces made of the materials of crystalline Si, amorphous Si, etc., the light-receiving face according to this invention has the spectral response to a shorter wavelength region. That is, it can be endowed with the peak of response to light of any desired wavelength between approximately 5,600 Å–4,500 Å.

(3) The after-image does not occur, and this characteristic is very favorable.

(4) The light-receiving face of this invention is excellent in the thermal resistance. In particular, whereas the amorphous Si(H) begins to decompose at about 350° C., the material containing 30% of C as constitutes the light-receiving face of this invention does not decompose until 500° C.

(5) The mechanical strength is high.

(6) The manufacturing method is easy.

(7) No toxic element is contained, and no environmental hazards are feared.

Hereunder, this invention will be described more in detail in connection with examples.

EXAMPLE 1

Amorphous $[Si_{1-x}C_x]_{1-y}[H]_y$ of various compositions were prepared by the reactive sputtering described previously. A sputtering equipment employed was the magnetron type apparatus shown in FIG. 1. A substrate on which a film was deposited was made of glass, and the substrate temperature was made 200° C. The composition ratio between Si and C was controlled by the ratio of areas which the respective components Si and C occupy in a target.

Examples of samples manufactured by the reactive sputtering are listed in Table 1.

TABLE 1

| Sample No. | $[Si_{1-x}C_x]_{1-y}[H]_y$ x | y | Band gap (eV) | Energy of center of spectral response (eV) |
|---|---|---|---|---|
| 1 | 0.01 | 0.3 | ~1.67 | ~2.21 |
| 2 | 0.02 | 0.3 | ~1.68 | ~2.23 |
| 3 | 0.05 | 0.3 | ~1.74 | ~2.28 |
| 4 | 0.1 | 0.3 | ~1.84 | ~2.37 |
| 5 | 0.15 | 0.3 | ~1.94 | ~2.49 |
| 6 | 0.2 | 0.3 | ~2.03 | ~2.56 |
| 7 | 0.25 | 0.3 | ~2.14 | ~2.67 |
| 8 | 0.3 | 0.3 | ~2.20 | ~2.76 |
| 9 | 0.02 | 0.1 | ~1.66 | ~2.19 |
| 10 | 0.1 | 0.1 | ~1.80 | ~2.35 |
| 11 | 0.3 | 0.2 | ~2.15 | ~2.73 |
| 12 | 0.4 | 0.2 | ~2.10 | Low photosensitivity |
| 13 | 0.6 | 0.2 | ~1.80 | Low photosensitivity |

TABLE 1-continued

| Sample No. | $[Si_{1-x}C_x]_{1-y}[H]_y$ x | y | Band gap (eV) | Energy of center of spectral response (eV) |
|---|---|---|---|---|
| 14 | 0.6 | 0.05 | ~1.40 | Almost no photosensitivity |

Figure 12:
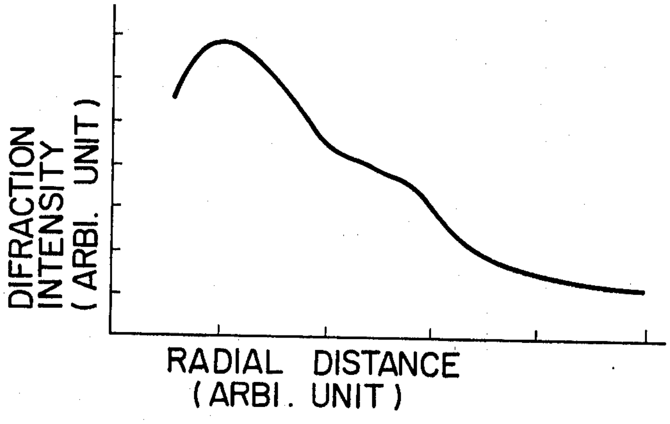
FIG. 12 is a graph showing the radial intensity profile of an electron diffraction pattern of the photoconductive material.

Various characteristics were measured under the condition under which the thickness of the film was 5,000 Å. The atmospheric gas was a mixed gas which consisted of Ar and hydrogen and which was under 0.1 Torr. The radio frequency power had a frequency of 13.65 MHz and an input of 250 W. As seen from Table 1, according to the photoconductive material of this invention, a material which has a peak of response to light of any desired wavelength between approximately 5,600 Å–4,500 Å can be realized by controlling the composition. FIG. 12 is a diagram showing the radial intensity profile of the electron diffraction pattern of Sample No. 8. It can be confirmed from the diagram that the material is amorphous. The intensity profiles become similar shapes over the whole composition range of the materials, and it is indicated that the materials are amorphous.

The photoconductive efficiency for light of 2.6 eV was measured. The results are exemplified in Table 2.

The photoconductive efficiency was measured in such a way that electrodes were disposed on both end parts of an amorphous thin film by evaporating aluminum and that the resistance across both the ends was measured. A xenon lamp was used as a light source, and the illumination light of the wavelength corresponding to 2.6 eV was obtained by spectrophotometry. The photoconductive efficiency was indicated by a relative value with a case of x=0 being set at 1.0.

TABLE 2

| $[Si_{1-x}C_x]_{1-y}[H]_y$ x | y | Relative value of photoconductive efficiency |
|---|---|---|
| 0 | 0.3 | ~1.0 |
| 0.1 | 0.3 | ~2.0 |
| 0.2 | 0.3 | ~2.7 |
| 0.3 | 0.3 | ~2.2 |

It is understood from the results of Table 2 that the peak of the spectral response shifts on the higher energy side with increase in the carbon content x.

Figure 13:
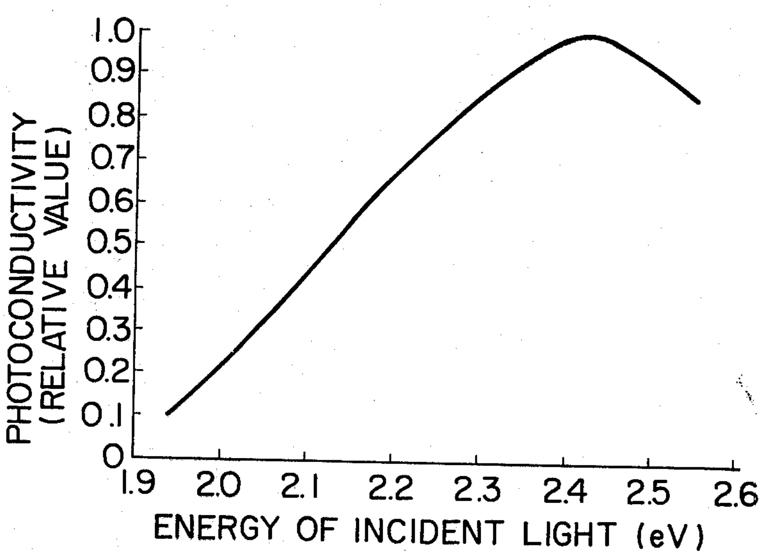
FIG. 13 is a graph showing the photoconductivity of the photoconductive material.

FIG. 13 is a diagram showing the relationship between the photoconductivity and the energy of incident light in an amorphous $Si_{1-x}C_x(H)$ in which x=0.14 and y=0.2.

Further, the amorphous $Si_{1-x}C_x(H)$ of this invention is excellent in the thermal resistance. This fact is very clearly supported by, for example, measuring the number of hydrogen atoms emitted by heating the material. Table 3 gives an example of the result.

TABLE 3

| | | Temperature at which the quantity of emitted hydrogen demonstrates a peak | Number of emitted hydrogen atoms (/cm³/degree) at the peak |
|---|---|---|---|
| comparative example | amorphous Si(H) | 500° C. | $6 \times 10^{19}$ |
| this invention | amorphous $Si_{0.7}C_{0.3}(H)$ | 700° C. | $5 \times 10^{19}$ |

As regards the materials of this invention, the temperature at which the quantity of emitted hydrogen is approximately proportional to the content of carbon. Even when the carbon content is 0.1 at %, the temperature at which the peak is demonstrated is about 570° C., and the effect of the thermal resistance is very great.

In this manner, the photoconductive material of the invention exhibits an extraordinarily remarkable effect in the thermal resistance.

It is as previously stated that hydrogen is especially effective for rendering the material amorphous. The role of hydrogen is considered as follows.

It is known that, in general, carbon synthesized in the vicinity of the normal temperature and the normal pressure assumes the graphitic structure of three-fold coordination to become a semimetal and that it does not become a semiconductor substance having the diamond structure of four-fold coordination. Merely by mixing carbon into an Si-based amorphous substance having the diamond bond of four-fold coordination, accordingly, it is not expected that an Si-C-based amorphous substance of four-fold coordination will be synthesized. In contrast, by introducing hydrogen, the amorphous $Si_{1-x}C_x(H)$ which is useful when applied to electron devices can be realized. This material is conjectured to be constructed as follows. That is, the so-called diamond structure of four-fold coordination in which the arrayal of the nearest atoms is such that the Si atom lies at the center of a tetrahedron and that the neighboring Si atoms assume the positions of the corners of the regular tetrahedron will form the fundamental unit, while dangling bonds which inevitably appear on account of amorphousness will be filled with hydrogen (H) in shapes such as Si-H and

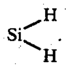

Using Si sputter targets each of which contained approximately $10^{19}$ $cm^{-3}$ of B or P, materials as listed in Table 4 were produced. Thus, the materials of the n- and p-conductivity types could be obtained.

TABLE 4

| Sample No. | $[Si_{1-x}C_x]_{1-y}[H]_y$ x | y | Band gap (eV) | Energy of center of spectral response (eV) | Impurity in target | Conductivity type |
|---|---|---|---|---|---|---|
| 1 | 0.1 | 0.3 | ~1.85 | ~2.37 | B | p-type |
| 2 | 0.1 | 0.3 | ~1.85 | ~2.37 | P | n-type |
| 3 | 0.3 | 0.3 | ~2.20 | ~2.75 | P | n-type |

EXAMPLE 2

In this example, the application of the amorphous material of this invention to a light-receiving face for an image tube will be explained.

A tin-oxide transparent conductive film 2 was formed on a glass substrate 1 to a thickness of 300 nm by the use of a method in which $SnCl_4$ was thermally decomposed in the air. Subsequently, a target in which a graphite piece having a purity of 99.9999% was placed on a substrate of silicon polycrystal having a purity of 99.99999% was attached to an r.f. sputtering equipment. Various samples were prepared by varying the ratio between the areas of silicon and carbon. An amorphous silicon film 3 was formed on the transparent conductive film by the reactive sputtering in each of various mixed atmospheres which consisted of argon under a pressure of $5\times10^{-3}$ Torr and hydrogen under pressures of $3\times10^{-4}-3\times10^{-3}$ Torr. In this case, the substrate was held at 200° C. The radio-frequency power was set at a frequency of 13.65 MHz and an input of 250 W. The thickness of the amorphous silicon film was about 2 μm. Examples of targets which had the amorphous $[Si_{1-x}C_x]_{1-y}[H]_y$ films thus formed are listed in Table 5.

TABLE 5

| Sample No. | $[Si_{1-x}C_x]_{1-y}[H]_y$ x | y | Resistivity Ω . cm | Energy of center spectral response (eV) |
|---|---|---|---|---|
| 1 | 0.01 | 0.3 | $\sim 2\times10^{12}$ | ~2.21 |
| 2 | 0.02 | 0.3 | $\sim 2\times10^{12}$ | ~2.23 |
| 3 | 0.05 | 0.3 | $\sim 3\times10^{12}$ | ~2.28 |
| 4 | 0.1 | 0.3 | $\sim 5\times10^{12}$ | ~2.37 |
| 5 | 0.15 | 0.3 | $\sim 6\times10^{12}$ | ~2.49 |
| 6 | 0.2 | 0.3 | $\sim 6\times10^{12}$ | ~2.56 |
| 7 | 0.25 | 0.3 | $\sim 6\times10^{12}$ | ~2.67 |
| 8 | 0.3 | 0.3 | $\sim 4\times10^{12}$ | ~2.76 |
| 9 | 0.02 | 0.1 | $\sim 1\times10^{12}$ | ~2.19 |
| 10 | 0.1 | 0.1 | $\sim 3\times10^{12}$ | ~2.35 |
| 11 | 0.3 | 0.2 | $\sim 4\times10^{12}$ | ~2.73 |

When the light-receiving faces formed in this way were used for vidicon type image tubes, the image tubes had excellent image pickup characteristics free of the after-image.

Figure 14:
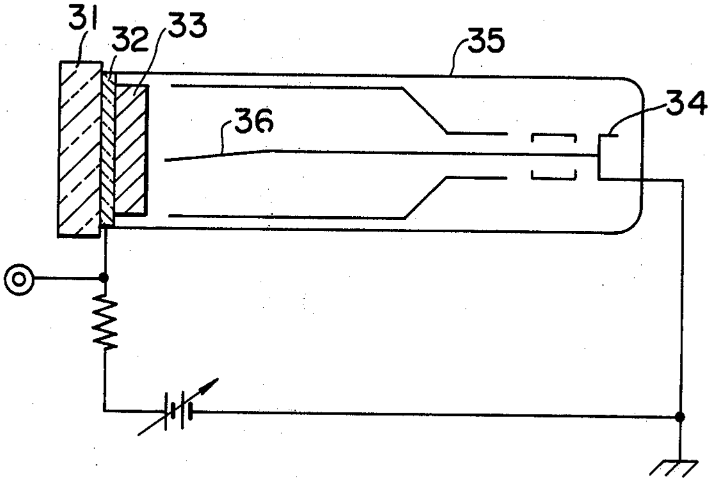
FIG. 14 is a sectional view of a photoconductive type image pickup tube which is a typical example of a storage type photosensor.

The photoconductive type image tube which is operated in the storage mode has a structure as shown in FIG. 14. It is composed of a light-transmitting substrate 31 usually called "faceplate", a transparent conductive film 32, a photoconductive layer 33, an electron gun 34, and an envelope 35. An optical image formed on the photoconductive layer 33 through the faceplate 31 is photoelectrically converted, and is stored as a charge pattern in the surface of the photoconductive layer 33. The stored charge pattern is time-sequentially read by a scanning electron beam 36.

In case where the photoconductive layer of this invention is used as the target of the image tube as shown in FIG. 14, it is desirable that an antimony-trisulfide is further stacked on the surface of the photoconductive layer 33 as a beam landing layer, to prevent the injection of electrons from the scanning electron beam 36 and to suppress the generation of secondary electrons from the photoconductive layer 33. To this end, the antimony-trisulfide film is evaporated in argon gas under a pressure of from $1\times10^{-3}$ Torr to $1\times10^{-2}$ Torr, and the thickness of the film may be in a range of from 10 nm to 1 μm. FIG. 8 is a sectional view showing an example of this structure. The transparent conductive film 32 and the photoconductive film 33 are disposed on the light-transmitting substrate 31, and the antimony-trisulfide film 41 is further formed thereon.

EXAMPLE 3

This example will be described with reference to FIG. 7. It is an example in which, likewise to Example 2, the amorphous material is applied to the light-receiving face of an image tube.

A mixture consisting of $SnO_2$ and $In_2O_3$ was deposited on a glass substrate 31 by the well-known r.f. sputtering, to form a transparent conductive film 32 which was 150 nm thick. Using a molybdenum boat, $CeO_2$ was vacuum-evaporated on the film 32 to a thickness of 20 nm. Thus, an n-type oxide layer 39 was formed. A target in which a high-purity graphite sheet (0.5 mm thick) having an areal ratio of 45% was placed on a silicon single-crystal doped with 0.5 ppm of boron was attached to an r.f. sputtering equipment. Subsequently, an amorphous silicon-carbon film 38 was formed on the resultant substrate to a thickness of 100 nm in an atmosphere which consisted of argon under $5\times10^{-3}$ Torr and hydrogen under $3\times10^{-3}$ Torr. At this time, the substrate temperature was held at 150° C. The amorphous silicon-carbon film thus formed contained approximately 40 atomic-% of hydrogen. Further, the partial pressure of argon was raised to $1\times10^{-2}$ Torr, whereupon in the mixed atmosphere consisting of the argon and the hydrogen already included, an amorphous silicon film 37 was formed on the film 38 to a thickness of 3 μm by the use of a high-purity silicon target. This amorphous silicon film contained about 25 atomic-% of hydrogen, and had a resistivity of $10^{12}\Omega$.cm. A light-receiving face thus formed was used as the target of a vidicon type image tube. Since this light-receiving face had a rectifying contact, the photoresponse speed was high and the dark current was low. Since the amorphous silicon-carbon film of high hydrogen concentration was included near the incident plane of light, the influence of the surface recombination was lessened owing to a band gap broader than in a silicon film, so that a high sensitivity was exhibited in the blue light region.

An equivalent effect can be obtained when the n-type oxide layer is made of tungsten oxide, niobium oxide, germanium oxide, molybdenum oxide or the like.

Further, it is favorable for the target of the vidicon type image tube that an antimony-trisulfide film in formed on the photoconductive film 33 consisting of the layers 38 and 37. The formation of the antimony-trisulfide film may be resorted to a method as follows. The substrate which has the photoconductive film consisting of the composite amorphous silicon films is installed in vacuum-evaporation apparatus. In argon gas under a pressure of $3\times10^{-3}$ Torr, antimony trisulfide is evaporated and formed to a thickness of 100 nm. This corresponds to the structure shown in FIG. 11.

In the present example, description has been made of the case where the amorphous silicon-carbon film 38 is inserted stepwise between the layers 32 and 37 in order to prevent the lowering of the blue sensitivity ascribable to the surface recombination. However, the photoconductive film 33 made up of the layers 38 and 37 need not be the stepped construction, but its composition may well be varied continuously. In this case, as the proportion of carbon in the amorphous silicon-carbon film is larger, the band gap becomes broader. It is therefore necessary that the carbon content is not lower on the side of the incidence of light (on the side of the substrate 31 in the present example). In case where the carbon content was varied continuously and rectilinearly from 30% to 0% over a thickness 3 μm of the photoconductive film 33, the blue sensitivity was enhanced by 80% over a case where no silicon was contained, and by 3% over the case of the stepped construction. This structure in which the composition is continuously varied is also excellent from the viewpoint of easy fabrication because, in case of fabricating the light-receiving face by the glow discharge method employing $SiH_4$ and $CH_4$, $C_2H_4$, $C_2H_2$ or the like, the flow rate of the gas of $CH_4$, $C_2H_4$, $C_2H_2$ or the like may be reduced sequentially and continuously.

EXAMPLE 4

This example will be described with reference to FIG. 9.

Figure 15:
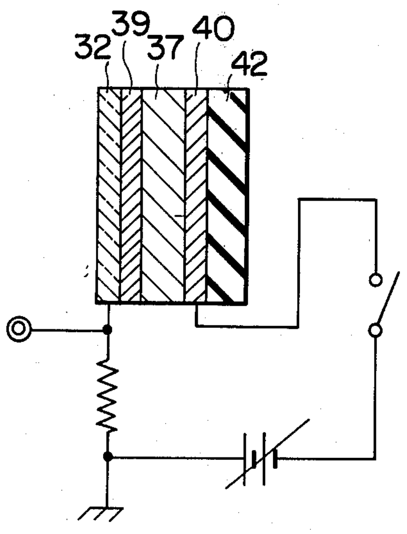
FIG. 15 is a sectional view of a light-receiving portion showing an example of a solid-state photosensor which employs the photoconductive material.

An aqueous solution of $SnCl_4$ was sprayed and oxidized on a glass substrate 31 heated to 400° C., to form an $SiO_2$ transparent conductive film 32. The resultant substrate was held at 200° C. within vacuum apparatus, and CdSe was evaporated on the transparent conductive film 32 as a photoconductive layer 38 to a thickness of 2 μm. Thereafter, the resultant film was heat-treated in the air at a temperature of 500° C. for one hour. Further, while holding the resultant substrate at 250° C. within the vacuum apparatus, an amorphous $[Si_{1-x}C_x]_{1-y}[H]_y$ layer 37 being 0.5 μm thick was evaporated by the electron-beam evaporation in an atmosphere of active hydrogen under $1\times10^{-3}$ Torr. Thereafter, the substrate temperature was returned to the normal temperature, and an antimony-trisulfide film 41 was evaporated to a thickness of 50 nm in an atmosphere of argon under $5\times10^{-3}$ Torr. Thus, the target of a vidicon type image tube was completed. The photosensor formed in this way utilized photo-carriers generated in the CdSe film, and therefore had a high photosensitivity over the whole visible region. Example 5:

This example will be described with reference to FIG. 15. Metal chromium was evaporated on an insulating smooth substrate 42 to a thickness of 100 nm under a pressure of $1\times10^{-6}$ Torr, to form an electrode 40. The resultant substrate was put into an r.f. sputtering equipment, and using an Si-C target, an amorphous $[Si_{1-x}C_x]_{1-y}[H]_y$ film 37 being 10 μm thick was formed at a substrate temperature of 130° C. in a gaseous mixture consisting of argon under $5\times10^{-3}$ Torr and hydrogen under $1\times10^{-3}$ Torr. The amorphous $[Si_{1-x}C_x]_{1-y}[H]_y$ film 37 had a resistivity of $\sim10^{12}\ \Omega$·cm. While holding the resultant substrate at 200° C., a niobium-oxide film 39 was deposited thereon to a thickness of 50 nm by the r.f. sputtering. Further, the resultant substrate was put into vacuum-evaporation apparatus, and while holding the substrate temperature at 150° C., metal indium was evaporated to a thickness of 100 nm in an atmosphere of oxygen under $1\times10^{-3}$ Torr. The resultant substrate was taken out into the air under 1 atm., and was heat-treated at 150° C. for one hour. Then, the metal indium turned into a transparent electrode 32 of indium oxide. When a photosensor thus fabricated had a voltage applied with the indium-oxide transparent electrode being positive and the metal chromium electrode being negative, it operated as a reverse-biased photodiode.

A photosensor as described below was also fabricated.

Metal chromium was evaporated on an insulating smooth substrate 42 to a thickness of 100 nm under a pressure of $1\times10^{-6}$ Torr, to form an electrode 40. The resultant substrate was put into an r.f. sputtering equipment. Using a target which contained 70 atomic-% of silicon and 30 atomic-% of carbon, an amorphous film 37 being 10 μm thick was formed at a substrate temperature of 200° C. in a gaseous mixture which consisted of argon under $2\times10^{-3}$ Torr and hydrogen under $2\times10^{-3}$ Torr. The amorphous film 37 had a resistivity of $5\times10^{12}$ Ω·cm. While holding the resultant substrate at 150° C., a film 39 of niobium oxide was deposited thereon to a thickness of 50 nm by the r.f. sputtering. Further, the resultant substrate was put into vacuum-evaporation apparatus. While holding the substrate temperature at 150° C., metal indium was evaporated to a thickness of 100 nm in an oxygen atmosphere under $1\times10^{-3}$ Torr. When the resultant substrate was taken out into the air under 1 atm. and heat-treated at 150° C. for 1 hour, the metal indium turned into an indium-oxide transparent electrode 32. A photosensor was fabricated in this way. It could be operated in the same manner as previously stated.

The present example consists in a solid-state photosensor. Although the order of forming the multiple film is converse to that in the cases of the image tube targets stated before, the structure of the light-receiving face has common parts. When the metal chromium electrode on the substrate in the present embodiment is divided into a large number of segments and the segments are sequentially connected by external switches with a circuit for reading stored charges, a linear or areal solid-state optical image sensor is obtained.

What is claimed is:

1. An article comprising a light-sensitive film constructed of at least a single layer of at least one photoconductive material on a substrate, wherein at least one layer of said at least a single layer is made of an amorphous photoconductive material whose composition is expressed by a formula $[Si_{1-x}C_x]_{1-y}[H]_y$ where $0\leqq x\leqq 0.3$ and $0.02\leqq y\leqq 0.3$, whereby said light-sensitive film exhibits photoconductive characteristics.

2. An article according to claim 1, wherein $0.02\leqq x\leqq 0.3$ and $0.02\leqq y\leqq 0.3$.

3. An article according to claim 1, wherein said amorphous material has a dark resistivity of at least $10^{10}$Ω·cm.

4. An article according to claim 2, wherein said amorphous material has a dark resistivity of at least $10^{10}$Ω·cm.

5. An article according to claim 1, wherein the at least one layer which is made of the amorphous photoconductive material is at least 100 nm thick.

6. An article according to claim 5, wherein said substrate comprises a faceplate having thereon a light-transmitting conducting layer, with at least one photoconductive layer positioned on said light-transmitting conducting layer, and with the amorphous photoconductive material layer adjacent said at least one photoconductive layer.

7. An article according to claim 1 or claim 5, wherein said amorphous photoconductive material has at least one impurity element incorporated therein for providing a desired conductivity type material.

8. An article comprising a light-sensitive film constructed of at least a single layer of at least one photoconductive material on a substrate, wherein at least one layer of said at least a single layer is made of an amorphous photoconductive material whose composition is expressed by a formula $[Si_{1-x}C_x]_{1-y}[H]_y$ where $0\leqq x\leqq 0.3$ and $0.02\leqq y\leqq 0.3$, whereby said light sensitive film exhibits photoconductive characteristics and wherein an n-type oxide layer is positioned between said light-sensitive film and said substrate, whereby injection of positive holes from the substrate into the light-sensitive film is prevented.

9. An article comprising a light-sensitive film constructed of at least a single layer of at least one photoconductive material on a substrate, wherein at least one layer of said at least a single layer is made of an amorphous photoconductive material whose composition is expressed by a formula $[Si_{1-x}C_x]_{1-y}[H]_y$ where $0<x\leqq 0.3$ and $0.02\leqq y\leqq 0.3$, and is at least 100 nm thick, whereby said light-sensitive film exhibits photoconductive characteristics and wherein an n-type oxide layer is positioned between said light-sensitive film and said substrate, whereby injection of positive holes from the substrate into the light-sensitive film is prevented.

10. An article comprising a light-sensitive film constructed of at least a single layer of at least one photoconductive material on a substrate, wherein at least one layer of said at least a single layer is made of an amorphous photoconductive material whose composition is expressed by a formula $[Si_{1-x}C_x]_{1-y}[H]_y$ where $0<x\leqq 0.3$ and $0.02\leqq y\leqq 0.3$, and is at least 100 nm thick, whereby said light-sensitive film exhibits photoconductive characteristics, wherein said substrate comprises a faceplate having thereon a light-transmitting conducting layer, with at least one photoconductive layer positioned on said light-transmitting conducting layer, and with the amorphous photoconductive material layer adjacent said at least one photoconductive layer, and wherein an n-type oxide layer is positioned between said light-sensitive film and said substrate, whereby injection of positive holes from the substrate into the light-sensitive film is prevented.

11. An article according to claim 8, 9 or 10, wherein the n-type oxide layer is made of a material selected from the group consisting of cerium oxide, tungsten oxide, niobium oxide, germanium oxide and molybdenum oxide.

12. An article according to claim 11, whereby said n-type oxide layer has a thickness of 5 nm to 100 nm.

13. An article comprising a light-sensitive film constructed of at least a single layer of at least one photoconductive material on a substrate, wherein at least one layer of said at least a single layer is made of an amorphous photoconductive material whose composition is expressed by a formula $[Si_{1-x}C_x]_{1-y}[H]_y$ where $0<x\leqq 0.3$ and $0.02\leqq y\leqq 0.3$, whereby said light-sensitive film exhibits photoconductive characteristics and wherein a layer of antimony trisulfide is positioned on top of the light-sensitive film.

14. An article comprising a light-sensitive film constructed of at least a single layer of at least one photoconductive material on a substrate, wherein at least one layer of said at least a single layer is made of an amorphous photoconductive material whose composition is expressed by a formula $[Si_{1}-C_x]_{1-y}[H]_y$ where $0<x\leqq 0.3$ and $0.02\leqq y\leqq 0.3$, whereby said light-sensitive film exhibits photoconductive characteristics and wherein a layer of antimony trisulfide is positioned on top of the light-sensitive film and is at least 100 nm thick.

15. An article comprising a light-sensitive film constructed of at least a single layer of at least one photoconductive material on a substrate, wherein at least one layer of said at least a single layer is made of an amorphous photoconductive material whose composition is expressed by a formula $[Si_{1-x}C_x]_{1-y}[H]_y$ where $0<x\leqq 0.3$ and $0.02\leqq Y\leqq 0.3$, whereby said light-sensitive film exhibits photoconductive characteristics wherein said substrate comprises a faceplate having thereon a light-transmitting conducting layer, with at least one photoconductive layer positioned on said light-transmitting conducting layer, and with the amorphous photoconductive material layer adjacent said at least one photoconductive layer, and wherein a layer of antimony trisulfide is positioned on top of the light-sensitive film and is at least 100 nm thick.

16. An article according to claim 13, 14 or 15 wherein the antimony trisulfide layer has a thickness of 10 nm to 1 μm.

17. An article according to claim 8, 9 or 10 wherein a layer of antimony trisulfide is positioned on top of the light-sensitive film.

18. An article according to claim 17, wherein the antimony trisulfide layer has a thickness of 10 nm to 1 μm.

19. An article comprising a light-sensitive film constructed of at least a single layer of at least one photoconductive material on a substrate, wherein at least one layer of said at least a single layer is made of an amorphous photoconductive material whose composition is expressed by a formula $[Si_{1-x}C_x]_{1-y}[H]_y$ where $0<x\leqq 0.3$ and $0.02\leqq y\leqq 0.3$, whereby said light-sensitive film exhibits photoconductive characteristics and wherein the at least one layer of the amorphous photoconductor material has a continuously varying composition with x varying from a high value of x 0.3 to a lower value less than said high value but greater than 0, from one surface to the opposite surface of said at least one layer of the amorphous photoconductive material, with a layer of $(si)_{1-y}(H)_y$ adjacent the surface of the amorphous photoconductive material having the lower value of x.

20. An article according to claim 19, wherein the surface of the at least one layer of the amorphous photoconductive material where x has said high value is adjacent said substrate.

21. An article according to claim 2, wherein said amorphous photoconductive material has a dark resistivity of at least $10^{10}$ Ω·cm.

22. An article according to claim 2, wherein said amorphous photoconductive material has incorporated therein at least one impurity element for providing a desired conductivity type material.

23. An article according to claim 1, wherein said light-sensitive film is constructed of at least two layers of at least one photoconductive material, with one of said at least two layers made of said amorphous photoconductive material, and with the amorphous photoconductive material layer having a higher resistivity than the other photoconductive layers of said light-sensitive film, whereby the amorphous photoconductive material layer can act to store charge patterns formed in the light-sensitive film.

24. An article comprising a light-sensitive film constructed of at least a single layer of at least one photoconductive material on a substrate, wherein at least one layer of said at least a single layer is made of an amorphous photoconductive material whose composition is expressed by a formula $[Si_{1-x}C_x]_{1-y}[H]_y$ where $0<x\leqq 0.3$ and $0.02\leqq y\leqq 0.3$, with up to 40% of the carbon in the amorphous photoconductive material being replaced by germanium, whereby said light-sensitive film exhibits photoconductive characteristics.

25. An article according to claim 24, wherein said amorphous photoconductive material has a dark resistivity of at least $10^{10}$ Ω·cm.

26. An article according to claim 24, wherein said amorphous photoconductive material has at least one impurity element incorporated therein for providing a desired conductivity type material.

* * * * *

UNITED STATES PATENT AND TRADEMARK OFFICE
CERTIFICATE OF CORRECTION

PATENT NO. : 4,289,822
DATED : SEPTEMBER 15, 1981
INVENTOR(S) : TOSHIKAZU SHIMADA, ET AL.

It is certified that error appears in the above-identified patent and that said Letters Patent is hereby corrected as shown below:

CLAIM 1, LINE 7, "$0 \leqq x \leqq 0.3$"
SHOULD BE --$0 < x \leqq 0.3$--

CLAIM 8, LINE 7, "$0 \leqq x \leqq 0.3$"
SHOULD BE --$0 < x \leqq 0.3$--

Signed and Sealed this

*Fourth* Day of *January 1983*

[SEAL]

*Attest:*

GERALD J. MOSSINGHOFF

*Attesting Officer* *Commissioner of Patents and Trademarks*